(12) United States Patent
Jang

(10) Patent No.: US 9,844,001 B2
(45) Date of Patent: Dec. 12, 2017

(54) SYSTEM AND METHOD FOR COVERAGE COMPENSATION IN A COMMUNICATION SYSTEM

(71) Applicant: Ke-Chi Jang, Plano, TX (US)

(72) Inventor: Ke-Chi Jang, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 14/452,986

(22) Filed: Aug. 6, 2014

(65) Prior Publication Data

US 2016/0057699 A1  Feb. 25, 2016

Related U.S. Application Data

(60) Provisional application No. 61/863,024, filed on Aug. 7, 2013.

(51) Int. Cl.
| | | |
|---|---|---|
| H04W 4/00 | (2009.01) |
| H04W 52/02 | (2009.01) |
| H04L 5/00 | (2006.01) |
| H04W 16/32 | (2009.01) |
| H04W 48/20 | (2009.01) |
| H04W 88/08 | (2009.01) |

(52) U.S. Cl.
CPC ....... *H04W 52/0206* (2013.01); *H04L 5/0055* (2013.01); *H04W 16/32* (2013.01); *H04W 48/20* (2013.01); *H04W 88/08* (2013.01); *Y02B 60/50* (2013.01)

(58) Field of Classification Search
CPC . H04W 52/343; H04W 24/02; H04W 52/242; H04W 52/228; H04W 28/18
USPC .................. 370/311, 388, 452, 335, 221, 254
See application file for complete search history.

(56) References Cited

U.S. PATENT DOCUMENTS

| | | | | |
|---|---|---|---|---|
| 8,903,375 B2* | 12/2014 | Amirijoo | ............ | H04W 52/146 455/424 |
| 2011/0170432 A1* | 7/2011 | Grokop | ................. | H04W 16/08 370/252 |
| 2013/0053051 A1* | 2/2013 | Fang | ................. | H04W 52/0206 455/452.1 |

FOREIGN PATENT DOCUMENTS

| | | |
|---|---|---|
| EP | 2 568 740 A1 | 3/2013 |
| EP | 2 663 131 A1 | 11/2013 |
| WO | WO 2012/127325 A2 | 9/2012 |

* cited by examiner

*Primary Examiner* — Chi H Pham
*Assistant Examiner* — Alexander O Boakye

(57) ABSTRACT

A system and method is provided for coverage compensation in a communication system. In one embodiment, a method of operating a source access point in an energy saving mode for selecting a target access point to provide coverage compensation includes providing a notify message including a first set of coverage parameters to a target access point requesting coverage compensation. The method also includes receiving a first response message from the target access point including an indication that the target access point cannot support the coverage compensation and at least one reason therefor.

16 Claims, 7 Drawing Sheets

SYSTEM AND METHOD FOR COVERAGE COMPENSATION IN A COMMUNICATION SYSTEM

CROSS-REFERENCE TO RELATED APPLICATION

This application claims the benefit of U.S. Provisional Application No. 61/863,024, entitled "Enhancement to Coverage Compensation Management between Source RAN and Target RAN in Energy Saving Mode with Power Off Request from Source RAN" filed on Aug. 7, 2013, which is incorporated herein by reference.

TECHNICAL FIELD

The present invention is directed, in general, to communication systems and, more particularly, to a system and method for coverage compensation management between a source radio access network and a target radio access network during an energy saving mode.

BACKGROUND

According to a currently defined method in the Third Generation Partnership Project 2 ("3GPP2") for code division multiple access ("CDMA"), if a source access point ("AP") with respect to a source radio access network ("RAN") decides to power off at some point in time to enter an energy saving mode, the source access point can send a power-off notify message to a target access point associated with a target radio access network before powering off. The power-off notify message informs neighbor access points, including the target access point, when the source access point is going to power off. The neighbor access points will then update their neighbor information at the time the source access point performs the power off. As used herein, the term access point refers to any communication device (e.g., a base station or router) that controls access to a radio access network such as, without limitation, a wireless microcell, a wireless pico cell and a WiMAX cell.

After the target access point receives the power-off notify message from the source access point, the target access point sends a response message to the source access point confirming receipt of the notification. The response message also provides an indication whether the target access point can provide coverage compensation for the source access point. Under the current systems, however, the information exchanged between the source and target access points associated with the coverage compensation function is limited.

Despite continued development efforts, these processes for providing coverage compensation have now become substantial hindrances from a system operational perspective for efficient global deployment of mobile radio access technology, particularly in view of a need to provide seamless wireless coverage for user equipment, and a growing need to provide wireless telecommunications services with reduced energy consumption. Accordingly, what is needed is an approach that overcomes the deficiencies in the current systems and methods.

SUMMARY OF THE INVENTION

These and other problems are generally solved or circumvented, and technical advantages are generally achieved, by advantageous embodiments of the present invention, a system and method for providing coverage compensation in a communication system. In one embodiment, a method of operating a source access point in an energy saving mode for selecting a target access point to provide coverage compensation includes providing a notify message including a first set of coverage parameters to a target access point requesting coverage compensation. The method also includes receiving a first response message from the target access point including an indication that the target access point cannot support the coverage compensation and at least one reason therefor. In another embodiment, a method of operating a target access point to provide coverage compensation for a source access point includes receiving a notify message including a first set of coverage parameters from the source access point requesting coverage compensation. The method also includes providing a first response message to the source access point including an indication that the target access point cannot support the coverage compensation and at least one reason therefor.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with association of a base station controller with a radio base station.

Figure 1:
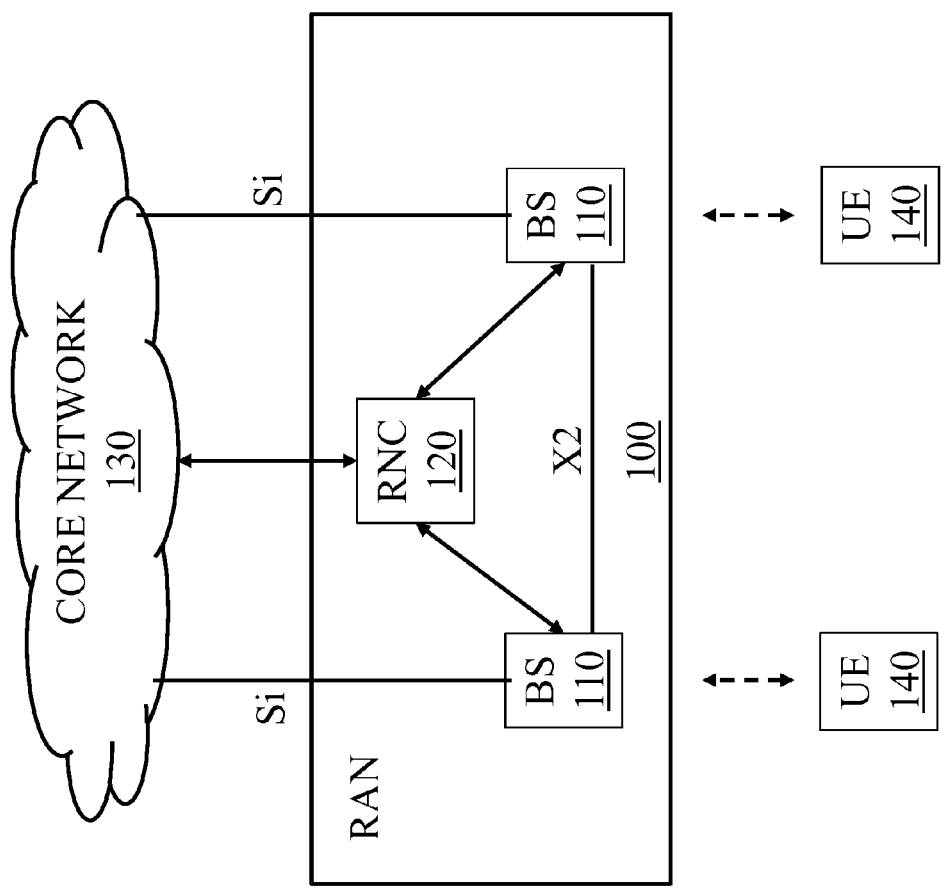
FIG. 1 illustrates a block diagram of an embodiment of a communication system.

Turning initially to FIG. 1, illustrated is a block diagram of an embodiment of a communication system. The communication system includes a radio access network ("RAN") 100 with a plurality of base stations (also referred to as "access points") 110 coupled indirectly via a radio network controller ("RNC") 120 or directly to a core network 130. The base stations 110 can communicate with one another through an X2 interface and with the core network 130 through Si interfaces. In some embodiments, functions of the RNC 120 may be performed by the base stations 110. The base stations 110 communicate over wireless channels with user equipment ("UE") 140 that are within their respective communication service cells (also referred to as coverage areas).

Figure 2:
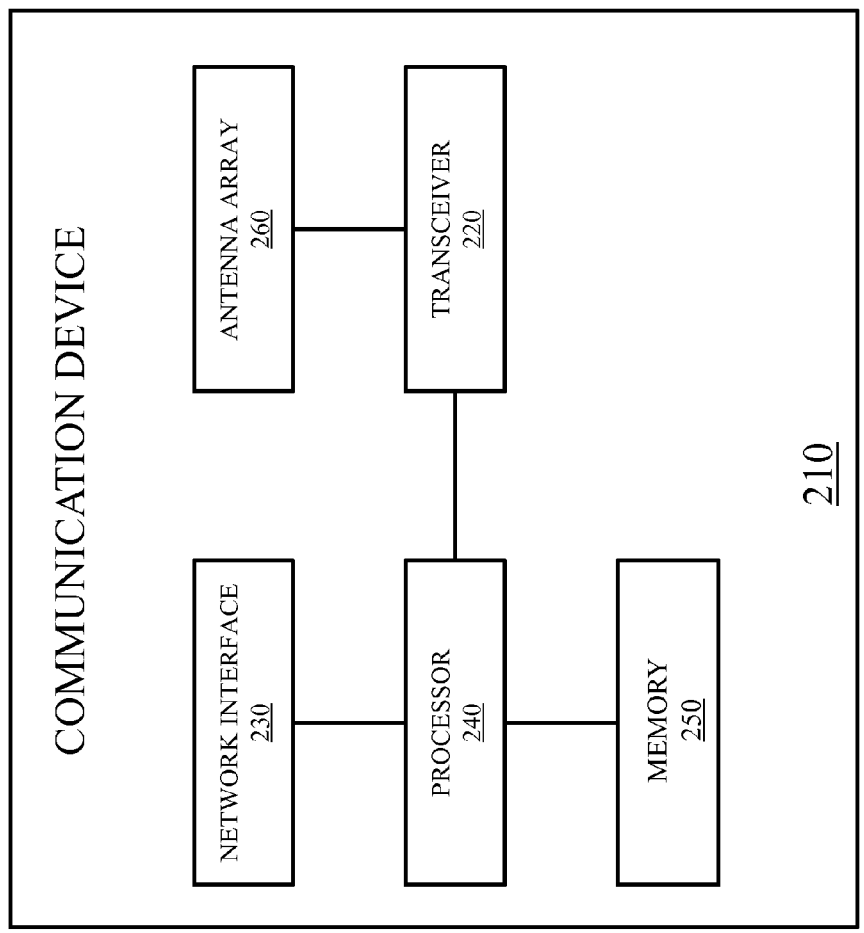
FIG. 2 illustrates a block diagram of an embodiment of a communication device.

Turning now to FIG. 2, illustrated is a block diagram of an embodiment of a communication device such as a base station (also referred to as an "access point") 210 of a communication system. The communication device 210 includes a transceiver 220, a network interface 230, a processor 240 and memory 250 containing functional modules. Of course, the communication device 210 may include a plurality of ones of the aforementioned components. Also, while transceiver 220 is illustrated, it will be appreciated that this component may be replaced by a separate receiver(s) and transmitter(s).

When the communication device 210 acts as a base station, the transceiver 220 (e.g., a 3GPP compliant transceiver) is configured to communicate with user equipment through an antenna array 260 via wireless channel. The transceiver 220 enables the base station to communicate with other nodes within the network such as by using a transceiver for wireless communication or other transmitting and receiving elements for wired or fiber-optic communication. By providing a plurality of antenna elements in the antenna array 260, the base station may receive multi-input/multi-output ("MIMO") communications allowing spatial multiplexing and/or diversity gain. A maximum number of uplink MIMO channels that may be received simultaneously by the base station may be equal to the number of antenna elements included in the antenna array 260.

The processor 240, which may be implemented with one or a plurality of processing devices, performs functions associated with its operation including, without limitation, pre-coding of antenna gain/phase parameters, encoding and decoding of individual bits forming a communication message, formatting of information and overall control of a respective communication element. Exemplary functions related to management of communication resources include, without limitation, hardware installation, traffic management, performance data analysis, configuration management, security, billing and the like. The processor 240 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples. The processor 240 is configured to execute computer program instructions from the memory 250 to perform at least some of the operations and methods described herein as being performed by a base station or other network node.

The memory 250 may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memory 250 may form a data buffer for data transmitted to and from the same. In the case of the user equipment, the memory 250 may store applications (e.g., virus scan, browser, and games) for use by the same. Exemplary embodiments of the system, subsystems, and modules as described herein may be implemented, at least in part, by computer software executable by processors of the data processing and control units, or by hardware, or by combinations thereof. It should also be noted that the units or modules described in this disclosure are to be regarded as logical entities and not with necessity as separate physical entities.

A process for providing coverage compensation between a source access point and a target access point will be described with respect to exemplary embodiments in a specific context, namely, a system and method that includes a process for coverage compensation in, for instance, a communication network operable with a 3GPP access point. While the principles will be described in the environment of a cellular communication network, any environment that may benefit from such a system and method that enables coverage compensation between a source access point and a target access point, particularly with a view toward seamless wireless coverage for user equipment and energy savings, is well within the broad scope of the present disclosure.

As mentioned above, the lack of information between access points pertaining to coverage compensation is a shortcoming of the current approaches to coverage compensation. For instance, if a target access point is not able to provide coverage compensation support to a source access point for any reason (e.g., under a loaded condition, an emergency situation, etc.), the response message from the target access point only indicates that the target access point cannot provide coverage compensation.

Based on this limited information, the source access point only knows that the target access point is not able to provide coverage compensation, but it does not know why the target access point cannot provide this function. It can be due to a heavy load condition, or simply that the target access point does not recognize the cell/sector information provided in the power-off notify message (also referred to as a "notify message"). Without more accurate and encompassing information, the source access point cannot make a better judgment to determine whether it should proceed with powering off, cancel the power-off event, or take some other action.

The current approaches to coverage compensation also do not provide a procedure to manage a target access point that can provide coverage compensation at a later time. If a target access point responded to an initial power-off notify message indicating it cannot provide coverage compensation for any reason and, at a later time, the target access point becomes available to provide coverage compensation based on existing defined method, the target access point will initiate the coverage compensation function without informing the source access point.

If the source access point does not take any other action to compensate the power-off event, there ordinarily would be no issue with the target access point starting the coverage compensation function without informing the source access point. If, however, the source access point has already taken another action to compensate the power-off event, such as initiating coverage compensation with a second target access point, then an action taken by the first target access point may create un-necessary interference to neighbor cells.

As introduced herein, new cause codes are defined to describe a reason why coverage compensation cannot be supported by a target access point. Examples of new cause codes, without limitation, are coverage compensation is not supported due to a heavy loading condition, coverage compensation is not supported due to unrecognized cell/sector/carrier information and coverage compensation is not supported due to a maintenance operation or an outage at the target access point. Another option is to allow a cause code information element ("IE") in the response message to include more than one cause code, if needed, to identify the reason for the lack of support. The cascaded cause values can better describe the situation at the target access point to allow a source access point to better understand why a target access point cannot provide coverage compensation and to take remedial measures as a result thereof.

Specific procedures are also introduced herein to address the case when the target access point later becomes available to provide coverage compensation. The target access point can send another response message associated with a particular source access point notify message X (X being the latest power-off notification from the source access point), the another response message indicating the target access point is now able to provide the coverage compensation for the notify message X (assuming the source access point has not canceled the power-off event). The target access point should not take action at this point, even though it sends another response message indicating that it can now provide coverage compensation. If the source access point still wants the target access point to provide the coverage compensation, it can send a notify or acknowledgement message to the target access point. If the proposed time for coverage compensation happens after the time specified in the notify message X, then the new time overwrites the time specified in the previous notify message X. The target access point responds to the new notify message with a coverage compensation supported indication.

The following is a description of an improved coverage compensation function, as introduced herein, based on the coverage compensation function defined for CDMA in 3GPP2. Of course, the coverage compensation function as described herein is applicable to other communication systems and standards such as long term evolution ("LTE") standards. To address the lack of information between the source and target access points, the cause information element in a response message from the target access point (e.g., an A27-ES response message) includes more than one cause code value. If the target access point is not able to provide coverage compensation, it can include a cause code for "coverage compensation cannot be supported" along with a second cause code value that specifies the reason why coverage compensation cannot be supported by the target access point. For example, the specific reason could be a heavy load condition at the target access point or, as another example, the target access point cannot recognize the cell/sector/carrier information provided by the source access point in the A27-ES notify message.

An alternative solution is to allow a definition of a new cause code value for the cause code information element in a response message, such as an A27-ES response message, to reflect the specific reason why coverage compensation cannot be supported. With this method, the format of cause code information element will not be modified. For example, a new cause code value can be defined for "coverage compensation is not supported due to heavy loading condition." Another example can be "coverage compensation is not supported due to unrecognized cell/sector/carrier information."

To address a situation wherein the target access point becomes available at a later time for coverage compensation, a three-way hand-shaking procedure is defined so that the target access point can know whether it should still provide coverage compensation to the source access point. For instance, the source access point sends an initial A27-ES notify message (X) to indicate that the source access point is going to power off at a time Y. The target access point is not able to provide coverage compensation at this point of time, and sends an A27-ES response message back to the source access point indicating "coverage compensation cannot be supported" at the time Y. Of course, the response message may include more than one cause value to specify an exact reason.

If at a later time the target access point is able to provide coverage compensation to the source access point (which may be before the time Y or after the time Y), the target access point sends an A27-ES response message to the source access point pointing to A27-ES notify message (X), and indicating coverage compensation is now supported. The target access point does not activate coverage compensation to the source access point at this point of time if time has already passed the time Y.

After receiving the A27-ES response message (pointing to the notify message (X)), if the source access point no longer needs the target access point to provide coverage compensation, the source access point does not need to respond to the target access point or can send a negative acknowledgement message. If source access point still wants the target access point to provide coverage compensation, the source access point sends an A27-ES notify message with a power-off indication. The message pointer can still be X or a new pointer. The source access point can maintain the power-off time Y or specify a new power-off time if needed. After receiving the A27-ES notify message with the power-off indication, the target access point sends an A27-ES response message with a "coverage compensation supported" indication. The following are examples of possible scenarios based on the solutions described hereinabove. The example radio access technology ("RAT") used is high rate packet data ("HRPD"). It should be understood that the messaging described herein are exemplary message types and other types of messaging may be employed to cover corresponding functions.

Figure 3:
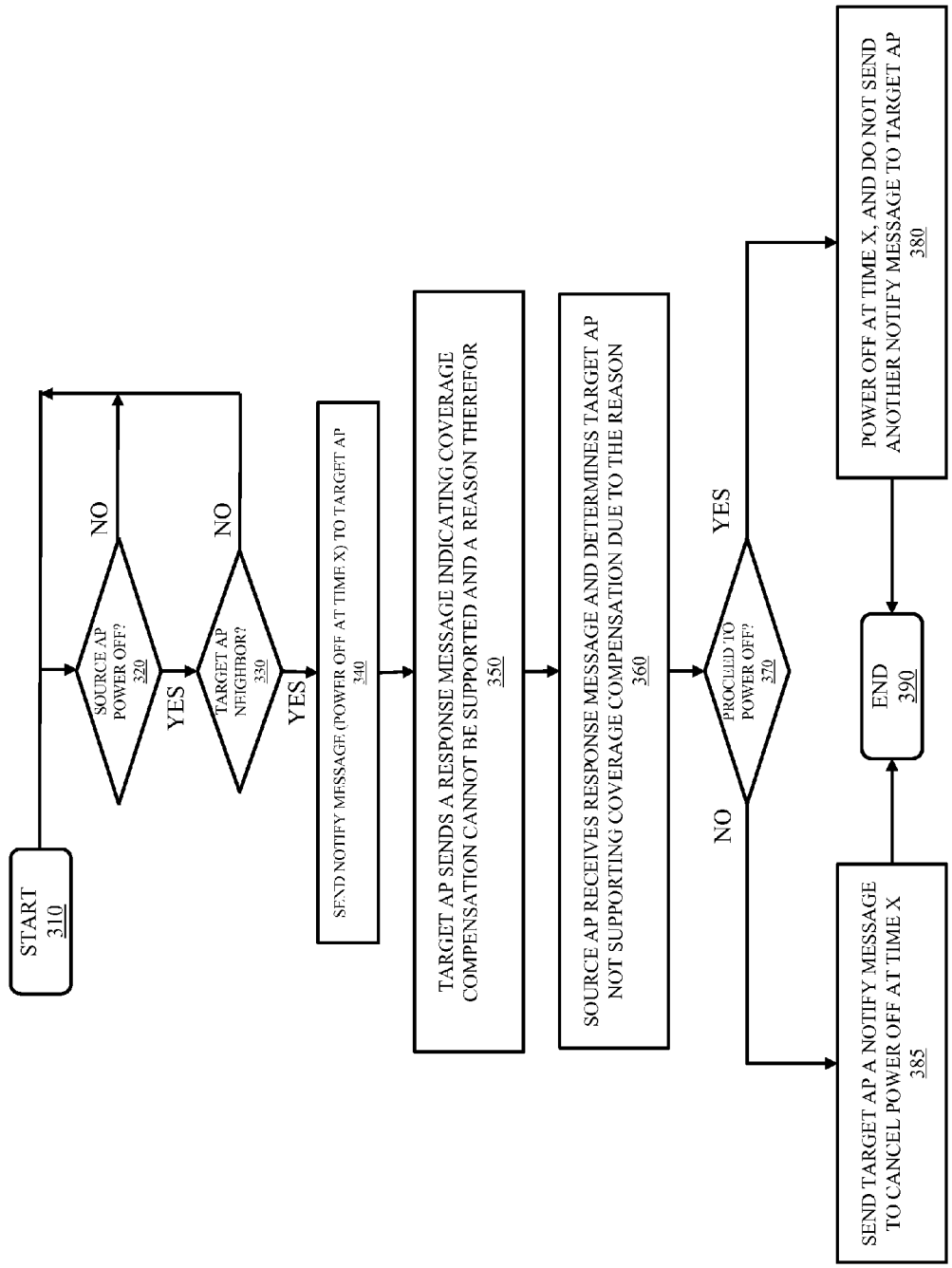
FIGS. 3 and 4 illustrate flowcharts of embodiments of methods of operating a communication system.
Figure 4:
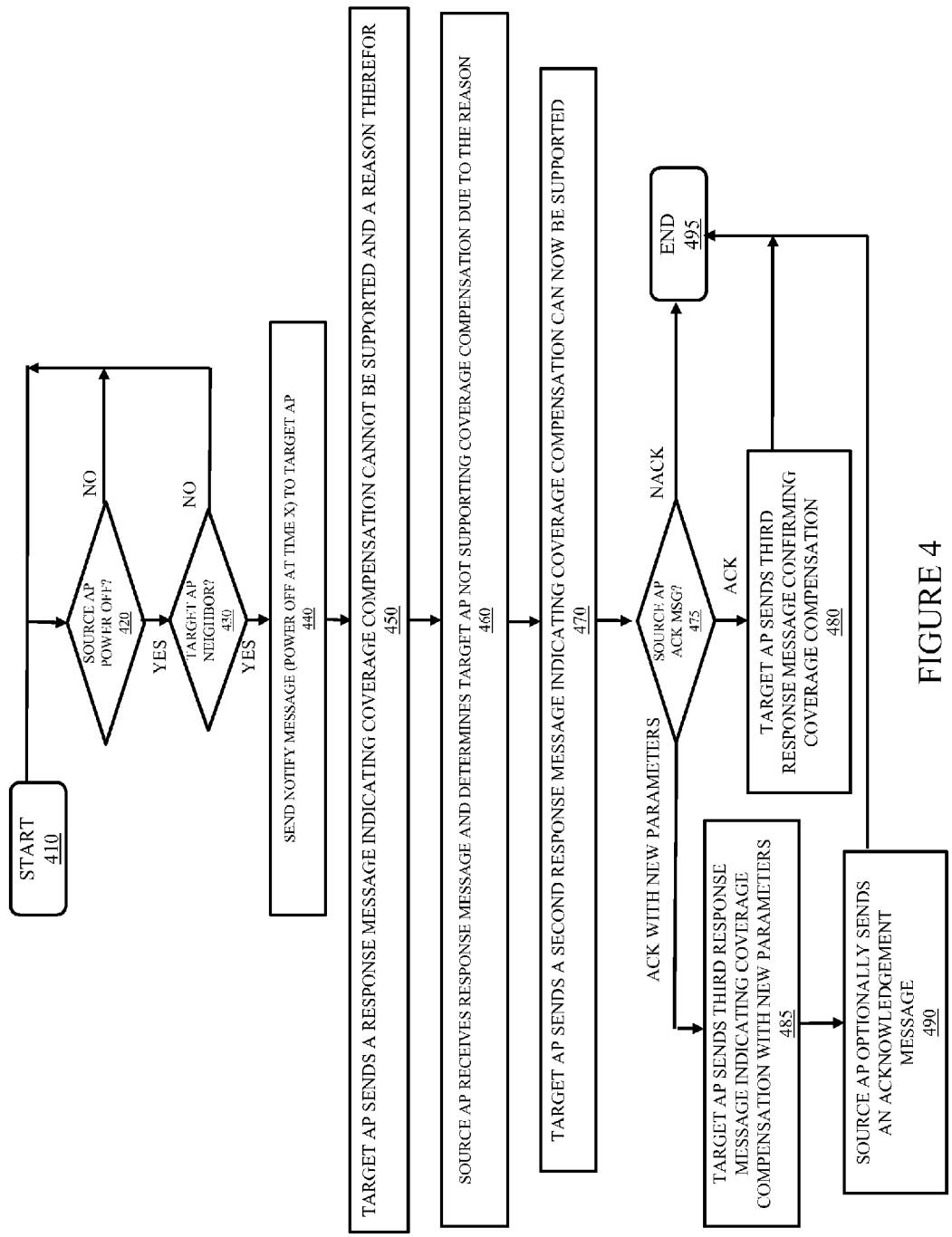

Turning now to FIGS. 3 and 4, illustrated are flowcharts of embodiments of methods of operating a communication system. Beginning with the method of FIG. 3, the method begins at a start step or module 310. At a decisional step or module 320, a source access point ("AP") determines if it can or should power off. For example, the source access point may determine that it is supporting insufficient traffic to warrant maintaining a power-on state. Such an event might occur for a picocell or microcell in a sports stadium during a time of low sporting activity. If the source access point determines it can power off, the method continues to a decisional step or module 330. Otherwise, the method returns to the step or module 320 for retesting, e.g., at a later time.

At the decisional step or module 330, the source access point determines if a target access point ("AP") is a neighbor that can potentially provide coverage compensation. If the target access point is not a neighbor, the method returns to the step or module 320 for retesting, e.g., at a later time. The number of times the method returns to the step or module 320 can be limited by a timer or by a counter. If the target access point is a neighbor, then in a step or module 340, the source access point sends a notify message (e.g., an A27-ES notify power off message) including a first set of coverage parameters indicating powering off at time X to the target access point. In addition to timing information, the first set of coverage parameters may include other communication resources necessary to provide the coverage compensation such as the required bandwidth, frequency information, communication technology, or any other parameters that facilitate the coverage compensation. For instance, a source access point may request that a target access point provide coverage compensation for a selected frequency band. The target access point may assess that it is under a heavy load condition and determines it cannot provide coverage compensation to the source access point.

In a step or module 350, the target access point sends a response message to the source access point indicating coverage compensation cannot be supported, including information that non-support is due to a particular reason such as due to the heavy load condition. Multiple cause values can be included in the response message to assist the source access point to decide whether it should continue with power off. In a step or module 360, the source access point receives the response message and recognizes that the target access point cannot support coverage compensation due to the particular condition(s). In a decisional step or module 370, the source access point determines in view of the response message received from the target access point whether to proceed to powering off. If source access point decides to power off, then in a step or module 380 the source AP powers off at time X and does not send another notify message to the target access point. If in the decisional step or module 370, the source access point determines that it cannot proceed to power off, then in a step or module 385, the source access point sends to the target access point another notify message to cancel its powering off at the time X. The method ends in a step or module 390.

Turning now to FIG. 4, the method begins at a start step or module 410. At a decisional step or module 420, a source access point ("AP") determines if it can or should power off. For example, the source access point may determine that it is supporting insufficient traffic to warrant maintaining a power-on state. Such an event might occur for a pico cell or microcell in a sports stadium during a time of low sporting activity. If the source access point determines it can power off, the method continues to a decisional step or module 430. Otherwise, the method returns to the step or module 420 for retesting, e.g., at a later time.

At the decisional step or module 430, the source access point determines if a target access point ("AP") is a neighbor that can potentially provide coverage compensation. If the target access point is not a neighbor, method returns to the step or module 420 for retesting, e.g., at a later time. The number of times the method returns to the step or module 420 can be limited by a timer or by a counter. If the target access point is a neighbor, then in a step or module 440, the source access point sends a notify message (e.g., an A27-ES notify power off message) including a first set of coverage parameters indicating powering off at time X to the target access point. The target access point may assess that it is under a heavy load condition and determines it cannot provide coverage compensation to the source access point according to the first coverage parameters.

In a step or module 450, the target access point sends a response message to the source access point indicating coverage compensation cannot be supported, including information that non-support is due to a particular reason(s) such as due to the heavy load condition. Multiple cause values can be included in the response message to assist the source access point to decide whether it should continue with power off. In a step or module 460, the source access point receives the response message and recognizes that the target access point cannot support coverage compensation due to the particular condition.

In the step or module 470, the target access point determines that it can now support coverage compensation and sends a second response message to the source access point indicating coverage compensation can now be supported. In the second response message, the target access point also includes an indication to which source access point notify message it is responding (e.g., based on a sequence number of the notify message).

In a decisional step or module 475, the source access point reassesses the need for coverage compensation and responds to the target access point by sending one of three types of an acknowledgment ("ACK") message. If the source access point determines that coverage compensation is no longer needed from the target access point, the source access point sends a negative acknowledgment ("NACK") message to the target access point and the method ends at a step or module 495.

If the source access point determines that coverage compensation is still needed from the target access point with the respect to the first notify message including the first set of coverage parameters, the source access point sends an acknowledgment ("ACK") message to the target access point. The target access point then sends a third response message to the source access point indicating coverage compensation can now be supported in a step or module 480. In the third response message, the target access point also includes an indication to which source access point message it is responding (e.g., based on a sequence number of the notify message). Consequently, the source access point powers down and the target access point provides the coverage compensation thererfor. The method then ends at the step or module 495.

If the source access point determines that coverage compensation is still needed from the target access point but with new parameters (i.e., a second set of coverage parameters such as a new start time for the coverage compensation), the source access point sends an acknowledgment ("ACK") message with new parameters to the target access point. The target access point then sends a third response message to the source access point indicating coverage compensation with the new parameters can now be supported in a step or module 485. In the third response message, the target access point also includes an indication to which source access point message it is responding (e.g., based on a sequence number of the notify or acknowledgement message). The source access point may optionally send an acknowledgement message to the third response message to the target access point in a step or module 490. Consequently, the source access point powers down and the target access point provides the coverage compensation thererfor. The method then ends at the step or module 495.

Figure 5:
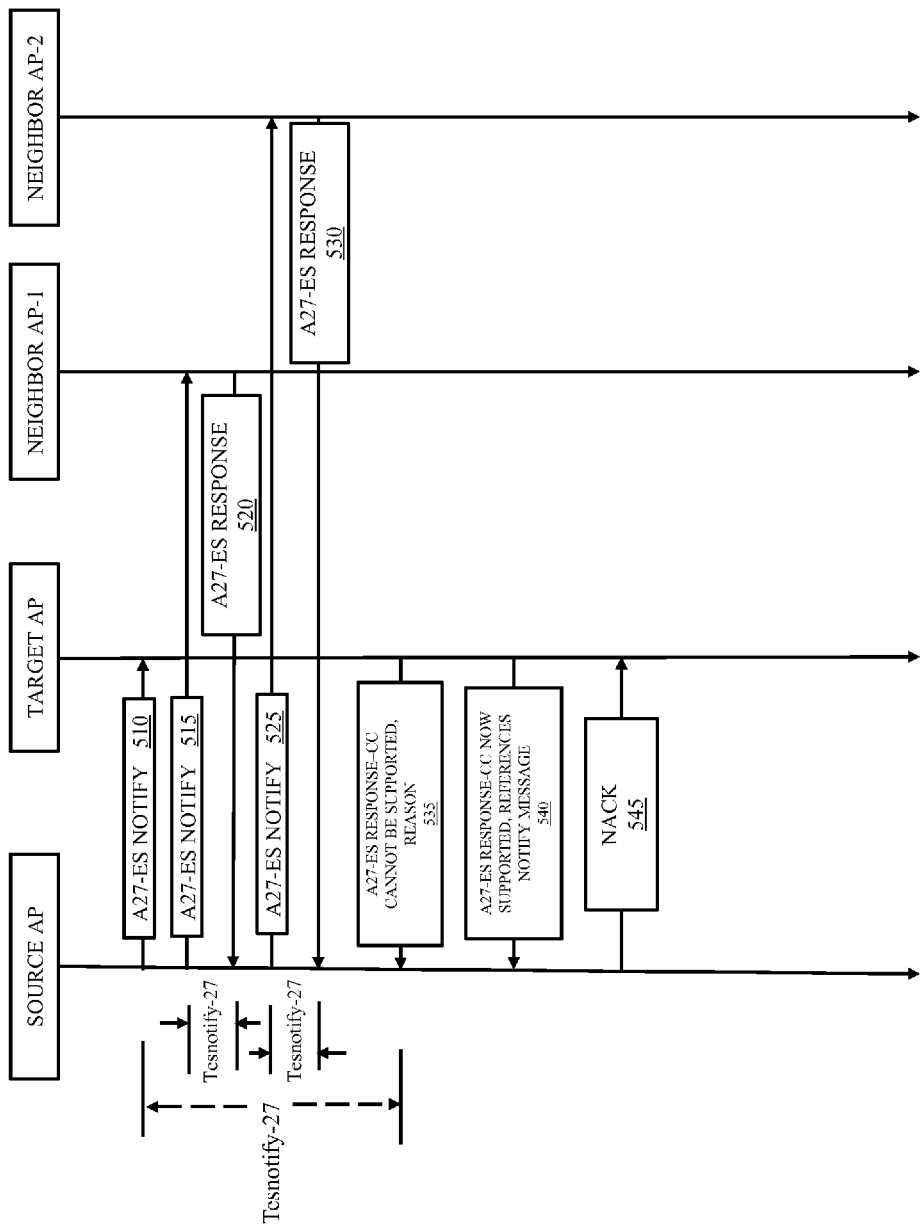
FIGS. 5, 6 and 7 illustrate signaling diagrams of embodiments of methods of operating a communication system.
Figure 6:
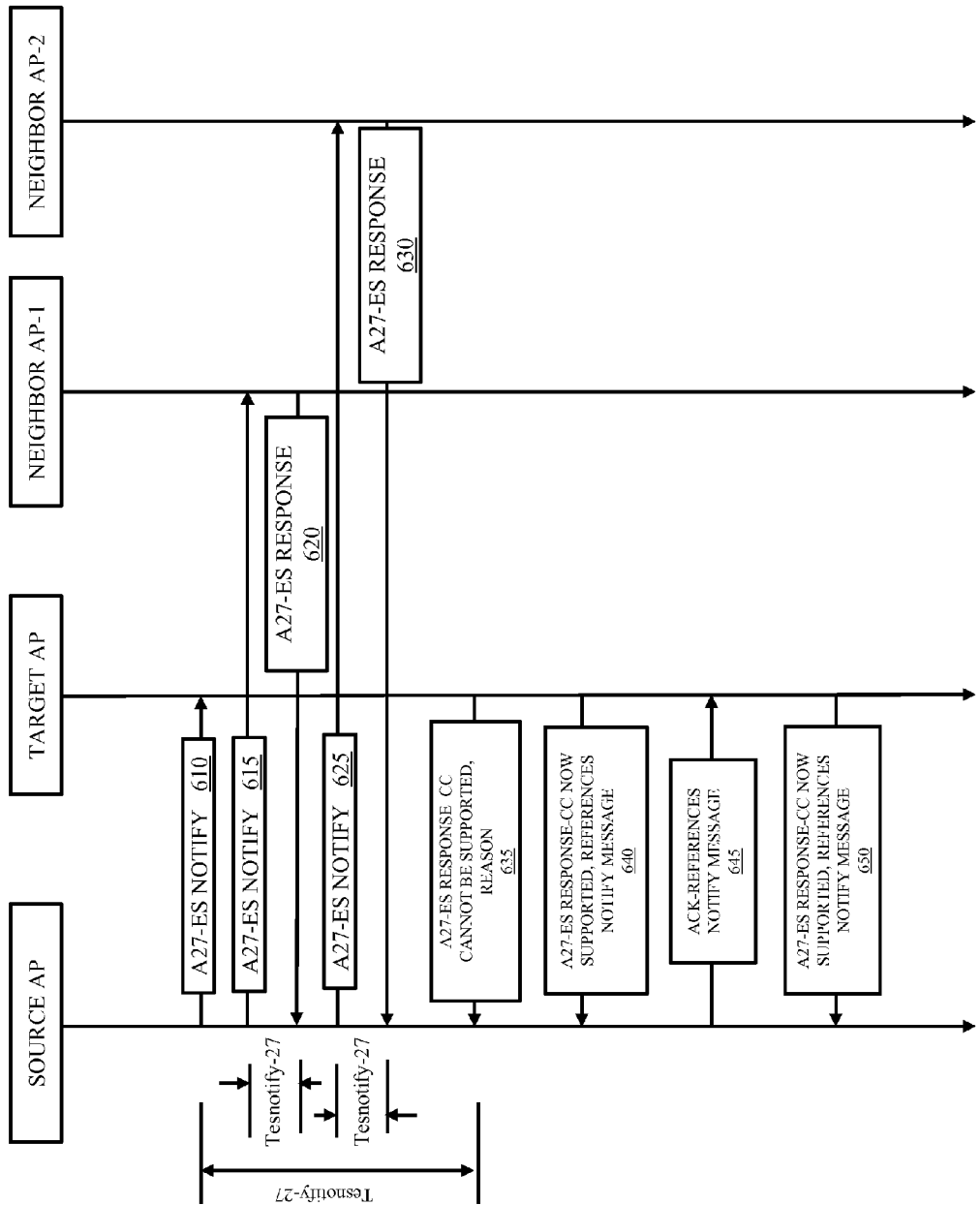
Figure 7:
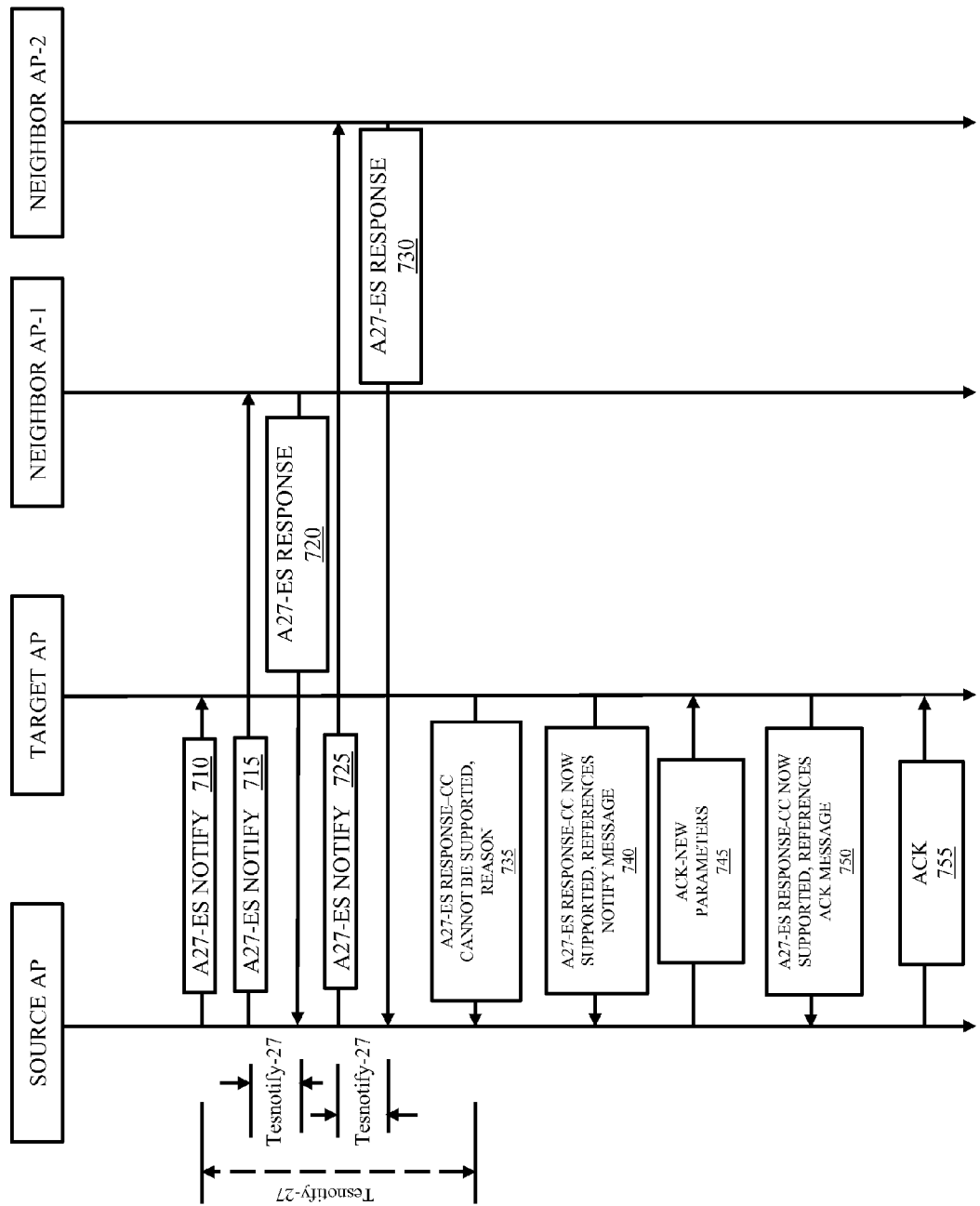

Turning now to FIGS. 5, 6 and 7, illustrated are signaling diagrams of embodiments of methods of operating a communication system. The signaling diagrams illustrate messaging between a source access point ("SOURCE AP"), a target access point ("TARGET AP") and first and second neighbor access points ("NEIGHBOR AP-1" and "NEIGHBOR AP-2"). The number of access points included in the FIGUREs is only for illustrative purposes, and more/fewer access points may be involved in the described process. Beginning with FIG. 5, the source access point decides to power off at a designated time, and transmits notify messages (e.g., A27-ES NOTIFY) 510, 515, 525 with a first set of coverage parameters to the target access point and the first and second neighbor access points. The first and second neighbor access points provide a response message (e.g., A27-ES RESPONSE) 520, 530 to the corresponding notify messages 515, 525 within time frames designated Tesnofify-27.

The target access point also provides a response message (e.g., A27-ES RESPONSE) 535 to the corresponding notify message 510 within the time frame designated Tesnofify-27 with a cause value that coverage compensation cannot be supported by the target access point and a further cause value of a reason why the coverage compensation cannot be supported (e.g., heavy load conditions). Subsequently at a later time, the target access point provides a second response message (e.g., A27-ES RESPONSE) 540 to the corresponding notify message 510 providing that coverage compensation with the first set of coverage parameters can now be supported by the target access point. Upon receiving the second response message, the source access point determines that coverage compensation from the target access point is no longer needed and sends a negative acknowledgement ("NACK") message 545 to the target access point informing the target access point of the same.

Analogous to the method of FIG. 5, the method of FIG. 6 begins with the source access point deciding to power off at a designated time, and transmitting notify messages (e.g., A27-ES NOTIFY) 610, 615, 625 with a first set of coverage parameters to the target access point and the first and second neighbor access points. The first and second neighbor access points provide a response message (e.g., A27-ES RESPONSE) 620, 630 to the corresponding notify messages 615, 625 within time frames designated Tesnofify-27.

The target access point also provides a response message (e.g., A27-ES RESPONSE) 635 to the corresponding notify message 610 within the time frame designated Tesnofify-27 with a cause value that coverage compensation cannot be supported by the target access point and a further cause value of a reason why the coverage compensation cannot be supported (e.g., heavy load conditions). Subsequently at a later time, the target access point provides a second response message (e.g., A27-ES RESPONSE) 640 to the corresponding notify message 610 providing that coverage compensation with the first set of coverage parameters can now be supported by the target access point. Upon receiving the second response message, the source access point determines that coverage compensation is still needed from the target access point and sends an acknowledgement ("ACK") message 645 referencing the notify message 610 including the first set of coverage parameters to the target access point informing the target access point of the same. The target access point then provides a third response message (e.g., A27-ES RESPONSE) 650 again referencing the notify message 610 providing that coverage compensation with the first set of coverage parameters can still be supported by the target access point.

Analogous to the methods of FIGS. 5 and 6, the method of FIG. 7 begins with the source access point deciding to power off at a designated time, and transmitting notify messages (e.g., A27-ES NOTIFY) 710, 715, 725 with a first set of coverage parameters to the target access point and the first and second neighbor access points. The first and second neighbor access points provide a response message (e.g., A27-ES RESPONSE) 720, 730 to the corresponding notify messages 715, 725 within time frames designated Tesnofify-27.

The target access point also provides a response message (e.g., A27-ES RESPONSE) 735 to the corresponding notify message 710 within the time frame designated Tesnofify-27 with a cause value that coverage compensation cannot be supported by the target access point and a further cause value of a reason why the coverage compensation cannot be supported (e.g., heavy load conditions). Subsequently at a later time, the target access point provides a second response message (e.g., A27-ES RESPONSE) 740 to the corresponding notify message 710 providing that coverage compensation with the first set of coverage parameters can now be supported by the target access point. Upon receiving the second response message, the source access point determines that coverage compensation is still needed from the target access point, but with new parameters (i.e., a second set of coverage parameters). The source access point then sends an acknowledgement ("ACK") message 745 describing that coverage compensation is needed with the second set of coverage parameters to the target access point. The target access point then provides a third response message (e.g., A27-ES RESPONSE) 750 referencing the acknowledgement message 745 providing that coverage compensation with the second set of coverage parameters can be supported by the target access point. The source access point then provides a subsequent acknowledgement ("ACK") message 755 to the third response message 750 to the target access point.

Thus, as introduced hereinabove, enhancements for coverage compensation provide accurate information why a target access point cannot provide coverage compensation. The information provided in messages allows a source access point to take appropriate action without guessing why a target access point cannot provide coverage compensation. The methods and procedures described herein avoid an out-of-sync situation related to coverage compensation that may lead to possible interference from a target access point if the target access point provides coverage compensation without notifying the source access point.

An apparatus (with a processor and memory including computer program code) and method are introduced herein to operate a source access point in an energy saving mode for selecting a target access point to provide coverage compensation. The apparatus and/or method are configured to provide a notify message including a first set of coverage parameters to the target access point requesting coverage compensation, and receive a first response message from the target access point including an indication that the target access point cannot support the coverage compensation and at least one reason therefor (e.g., a heavy load condition associated with the target access point). The first response message may include more than one cause code in a cause information element. The apparatus and/or method are also configured to receive a second response message from the target access point referring to the notify message and including an indication that the target access point can now support the coverage compensation with the first set of coverage parameters.

The apparatus and/or method are also configured to provide an acknowledgment message to the target access point in response to the second response message. The acknowledgment message may indicate that the coverage compensation is now no longer needed. The acknowledgment message may indicate that the source access point still needs the coverage compensation with the first set of coverage parameters. In such a case, the apparatus and/or method are also configured to receive a third response message from the target access point referring to the notify message and including an indication that the target access point can still support the coverage compensation with the first set of coverage parameters.

The acknowledgment message may also include a request for the coverage compensation including a second set of coverage parameters. In such a case, the apparatus and/or method are also configured to receive a third response message from the target access point referring to the acknowledgment message and including an indication that the target access point can support the coverage compensation with the second set of coverage parameters.

An apparatus (with a processor and memory including computer program code) and method are also introduced herein to operate a target access point to provide coverage compensation for a source access point. The apparatus and/or method are configured to receive a notify message including a first set of coverage parameters from the source access point requesting coverage compensation, and provide a first response message to the source access point including an indication that the target access point cannot support the coverage compensation and at least one reason therefor (e.g., a heavy load condition associated with the target access point). The first response message may include more than one cause code in a cause information element. The apparatus and/or method are also configured to provide a second response message to the source access point referring to the notify message and including an indication that the target access point can now support the coverage compensation with the first set of coverage parameters.

The apparatus and/or method are also configured to receive an acknowledgment message from the source access point in response to the second response message. The acknowledgment message may indicate that the coverage compensation is now no longer needed. The acknowledgment message may indicate that the source access point still needs the coverage compensation with the first set of coverage parameters. In such a case, the apparatus and/or method are also configured to provide a third response message to the source access point referring to the notify message and including an indication that the target access point can still support the coverage compensation with the first set of coverage parameters.

The acknowledgment message may also include a request for the coverage compensation including a second set of coverage parameters. In such a case, the apparatus and/or method are also configured to provide a third response message to the source access point referring to the acknowledgment message and including an indication that the target access point can support the coverage compensation with the second set of coverage parameters.

It will be understood that the access points and any other components described herein may be implemented by one or more of a processor or a microprocessor and adequate software with suitable storage therefore, a programmable logic device, or other electronic hardware components. Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method of operating a source access point in an energy saving mode for selecting a target access point to provide coverage compensation, comprising:
   providing a notify message including a first set of coverage parameters to said target access point requesting coverage compensation;
   receiving a first response message from said target access point including an indication that said target access point cannot support said coverage compensation and at least one reason therefor; and
   receiving a second response message from said target access point referring to said notify message and including an indication that said target access point can now support said coverage compensation with said first set of coverage parameters.

2. The method as recited in claim 1 further comprising providing an acknowledgment message to said target access point in response to said second response message, said acknowledgment message indicating that said coverage compensation is now no longer needed.

3. The method as recited in claim 1, further comprising:
providing an acknowledgment message to said target access point in response to said second response message, said acknowledgment message indicating that said source access point still needs said coverage compensation with said first set of coverage parameters; and
receiving a third response message from said target access point referring to said notify message and including an indication that said target access point can still support said coverage compensation with said first set of coverage parameters.

4. The method as recited in claim 1, further comprising:
providing an acknowledgment message to said target access point in response to said second response message, said acknowledgment message comprising a request for said coverage compensation including a second set of coverage parameters; and
receiving a third response message from said target access point referring to said acknowledgment message and including an indication that said target access point can support said coverage compensation with said second set of coverage parameters.

5. An apparatus configured to operate a source access point in an energy saving mode for selecting a target access point to provide coverage compensation, comprising:
a processor; and
memory including computer program code, said memory and said computer program code configured to, with said processor, cause said apparatus to perform at least the following:
provide a notify message including a first set of coverage parameters to said target access point requesting coverage compensation;
receive a first response message from said target access point including an indication that said target access point cannot support said coverage compensation and at least one reason therefor; and
receive a second response message from said target access point referring to said notify message and including an indication that said target access point can now support said coverage compensation with said first set of coverage parameters.

6. The apparatus as recited in claim 5 wherein said memory and said computer program code are configured to, with said processor, cause said apparatus to provide an acknowledgment message to said target access point in response to said second response message, said acknowledgment message indicating that said coverage compensation is now no longer needed.

7. The apparatus as recited in claim 5 wherein said memory and said computer program code are configured to, with said processor, cause said apparatus to:
provide an acknowledgment message to said target access point in response to said second response message, said acknowledgment message indicating that said source access point still needs said coverage compensation with said first set of coverage parameters; and
receive a third response message from said target access point referring to said notify message and including an indication that said target access point can still support said coverage compensation with said first set of coverage parameters.

8. The apparatus as recited in claim 5 wherein said memory and said computer program code are configured to, with said processor, cause said apparatus to:
provide an acknowledgment message to said target access point in response to said second response message, said acknowledgment message comprising a request for said coverage compensation including a second set of coverage parameters; and
receive a third response message from said target access point referring to said acknowledgment message and including an indication that said target access point can support said coverage compensation with said second set of coverage parameters.

9. A method of operating a target access point to provide coverage compensation for a source access point, comprising:
receiving a notify message including a first set of coverage parameters from said source access point requesting coverage compensation;
providing a first response message to said source access point including an indication that said target access point cannot support said coverage compensation and at least one reason therefor; and
providing a second response message to said source access point referring to said notify message and including an indication that said target access point can now support said coverage compensation with said first set of coverage parameters.

10. The method as recited in claim 9 further comprising receiving an acknowledgment message from said source access point in response to said second response message, said acknowledgment message indicating that said coverage compensation is now no longer needed.

11. The method as recited in claim 9, further comprising:
receiving an acknowledgment message from said source access point in response to said second response message, said acknowledgment message indicating that said source access point still needs said coverage compensation with said first set of coverage parameters; and
providing a third response message to said source access point referring to said notify message and including an indication that said target access point can still support said coverage compensation with said first set of coverage parameters.

12. The method as recited in claim 9, further comprising:
receiving an acknowledgment message from said source access point in response to said second response message, said acknowledgment message comprising a request for said coverage compensation including a second set of coverage parameters; and
providing a third response message to said source access point referring to said acknowledgment message and including an indication that said target access point can support said coverage compensation with said second set of coverage parameters.

13. An apparatus configured to operate a target access point to provide coverage compensation for a source access point, comprising:
a processor; and
memory including computer program code, said memory and said computer program code configured to, with said processor, cause said apparatus to perform at least the following:
receive a notify message including a first set of coverage parameters from said source access point requesting coverage compensation;

provide a first response message to said source access point including an indication that said target access point cannot support said coverage compensation and at least one reason therefor; and provide a second response message to said source access point referring to said notify message and including an indication that said target access point can now support said coverage compensation with said first set of coverage parameters.

14. The apparatus as recited in claim 13 wherein said memory and said computer program code are configured to, with said processor, cause said apparatus to receive an acknowledgment message from said source access point in response to said second response message, said acknowledgment message indicating that said coverage compensation is now no longer needed.

15. The apparatus as recited in claim 13 wherein said memory and said computer program code are configured to, with said processor, cause said apparatus to:

receive an acknowledgment message from said source access point in response to said second response message, said acknowledgment message indicating that said source access point still needs said coverage compensation with said first set of coverage parameters; and provide a third response message to said source access point referring to said notify message and including an indication that said target access point can still support said coverage compensation with said first set of coverage parameters.

16. The apparatus as recited in claim 13 wherein said memory and said computer program code are configured to, with said processor, cause said apparatus to:

receive an acknowledgment message from said source access point in response to said second response message, said acknowledgment message comprising a request for said coverage compensation including a second set of coverage parameters; and provide a third response message to said source access point referring to said acknowledgment message and including an indication that said target access point can support said coverage compensation with said second set of coverage parameters.

\* \* \* \* \*